US008650870B2

(12) United States Patent
Overman (10) Patent No.: US 8,650,870 B2
(45) Date of Patent: Feb. 18, 2014

(54) WAVE ACTUATED DEVICES (76) Inventor: Aaron Overman, Portland, OR (US)

( * ) Notice: Subject to any disclaimer, the term of this patent is extended or adjusted under 35 U.S.C. 154(b) by 325 days.

(21) Appl. No.: 13/235,198

(22) Filed: Sep. 16, 2011

(65) Prior Publication Data
US 2013/0067902 A1 Mar. 21, 2013

(51) Int. Cl.
F03B 13/18 (2006.01)
F03B 13/10 (2006.01)
F03B 13/12 (2006.01)
H02P 9/04 (2006.01)

(52) U.S. Cl.
USPC .......... 60/497; 60/506; 290/42; 290/53

(58) Field of Classification Search
USPC .................. 60/495–507; 290/42, 53
See application file for complete search history.

(56) References Cited

U.S. PATENT DOCUMENTS 917,823 A * 4/1909 White ............................. 60/497
3,011,062 A * 11/1961 Goldsmith ..................... 290/53

* cited by examiner

Primary Examiner — Christopher Jetton
(74) Attorney, Agent, or Firm — Mohr Intellectual Property Law Solutions (57) ABSTRACT The present disclosure is directed to wave actuated devices for converting wave energy from waves passing through water into mechanical work, the wave actuated devices including primary buoys floating in the water and configured to rise and fall with the waves as they pass through the water between lower position and upper positions, carriages coupled to the primary buoy by a linkage and moving between first and second positions, carriage magnetically interactive materials mounted to the carriages, a support structure extending from a support surface and including a pivot spaced from the support surface, and an arm pivotally supported on the pivot and extending from the pivot to a first end proximate the carriage magnetically interactive material. Some examples of wave actuated devices implement buoy force to return the system to a state of potential energy as a wave triggers the device.

20 Claims, 9 Drawing Sheets

WAVE ACTUATED DEVICES

BACKGROUND

The present disclosure relates generally to wave actuated devices that harness wave energy to drive a generator. In particular, the present disclosure discusses wave actuated devices that implement buoyancy and magnetism to more efficiently harness wave energy.

Due to fears of the environmental impact of fossil-fuel based energy sources and concern over the amount of non-renewable energy sources and fuels, there exists a need for renewable energy sources. Wave actuated devices provide an opportunity to generate clean, renewable energy harnessing the potential energy in liquid waves. However, known wave actuated devices are not entirely satisfactory for the range of applications in which they are employed. Existing wave devices do not implement supplemental forces to augment the efficiency in which they harness wave energy to drive a generator. Failing to efficiently supplement existing wave energy has prevented wave generators from generating power at optimal efficiency. As a result, there exists a need for wave actuated devices that implement means to augment the efficiency with which they harness wave energy.

In particular, there exists a need for wave actuated devices that are configured to efficiently harness the potential energy contained within small-crested waves.

Thus, there exists a need for wave actuated devices that improve upon and advance the design of known wave actuated devices. Examples of new and useful wave actuated devices that introduce these features, along with other novel and unobvious inventive features, will now be described.

SUMMARY

The present disclosure is directed to wave actuated devices for converting wave energy into mechanical work. The disclosed wave actuated devices include a primary buoy, a carriage, magnetically interactive materials, a support structure, and an arm. In some examples, the primary buoy is coupled to the carriage and pulls the carriage as it rises with a cresting wave.

In some examples, the arm is pivotally mounted to the support structure and includes a supplemental buoy. The magnetically interactive materials may be mounted to the carriage and to the ends of the arm. In some examples, the magnetic interaction between the carriage and the arm pivots the arm through a trigger arc as the carriage is pulled by the primary buoy. The arm may also pivot through a drive arc in response to the upward buoyancy force of the supplemental buoy.

DETAILED DESCRIPTION

The disclosed wave actuated devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various wave actuated devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-8, a first example of a wave actuated device for converting wave energy from waves passing through water into mechanical work, wave actuated device 100, will now be described. Wave actuated device 100 includes a primary buoy 110, rails 108, a carriage 120, a linkage guide 118, a retaining bar 129, a support structure 130, a first driveshaft 142*i*, a second driveshaft 142*ii*, a first tube 141*i* a second tube 141*ii*, a first tube magnetically interactive material 139*i*, a second tube magnetically interactive material 139*ii*, an arm 144, a generator 170, a first arc segment 180*i* and a second arc segment 180*ii*. Wave actuated device 100 is configured to be placed in a liquid body 102 containing a liquid 103 defining a liquid surface that varies in height. Wave actuated device 100 is configured to scale to harness the potential energy contained in waves of varying sizes.

For example, wave actuated device 100 may be scaled up to harness energy from large waves, such as ocean waves, or scaled down to small-crested waves. Wave actuated device 100 may additionally or alternatively be scaled to harness the potential energy of non cresting liquid surface elevation changes, including the non cresting waves present in lakes and rivers.

Figure 5:
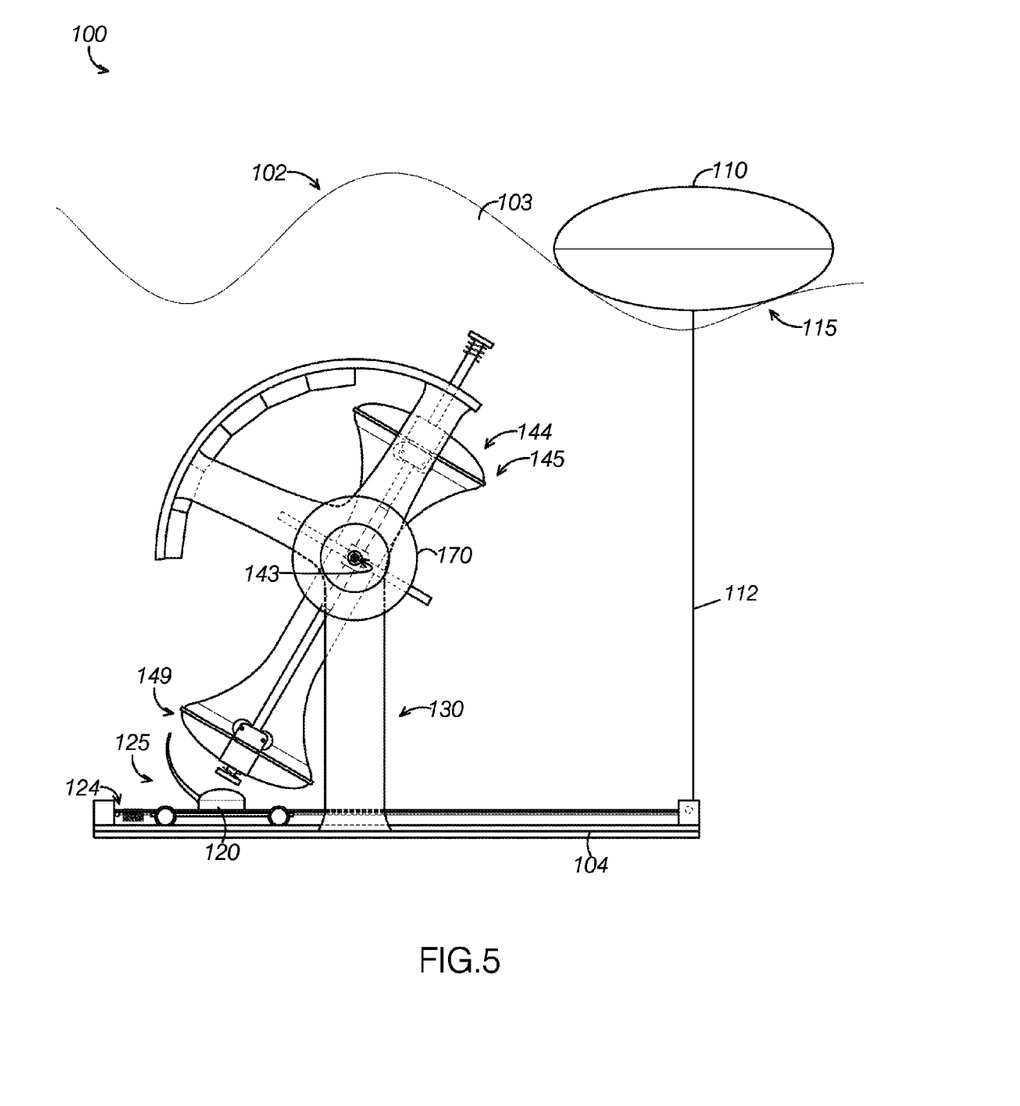
FIG. 5 is a side elevation view of the wave actuated device shown in FIG. 1 depicting the primary buoy in the lower position and the carriage in the first position.

As FIG. 5 illustrates, wave actuated device 100 includes primary buoy 110 enclosing a volume of gas that gives primary buoy 110 a selected buoyancy in liquid 103. Primary buoy 110 includes a linkage 112 connected to carriage 120. Primary buoy 110 is configured to rise and fall with the waves as they flow through liquid body 102 proximate primary buoy 110. As waves flow proximate primary buoy 110, primary buoy 110's buoyancy causes the buoy to adjust with the liquid body 102 between a lower position 115 shown in FIGS. 1 and 5 and an upper position 116 shown in FIGS. 2 and 6. As primary buoy 110 moves towards upper position 116 it produces a vertically directed buoy force.

Figure 1:
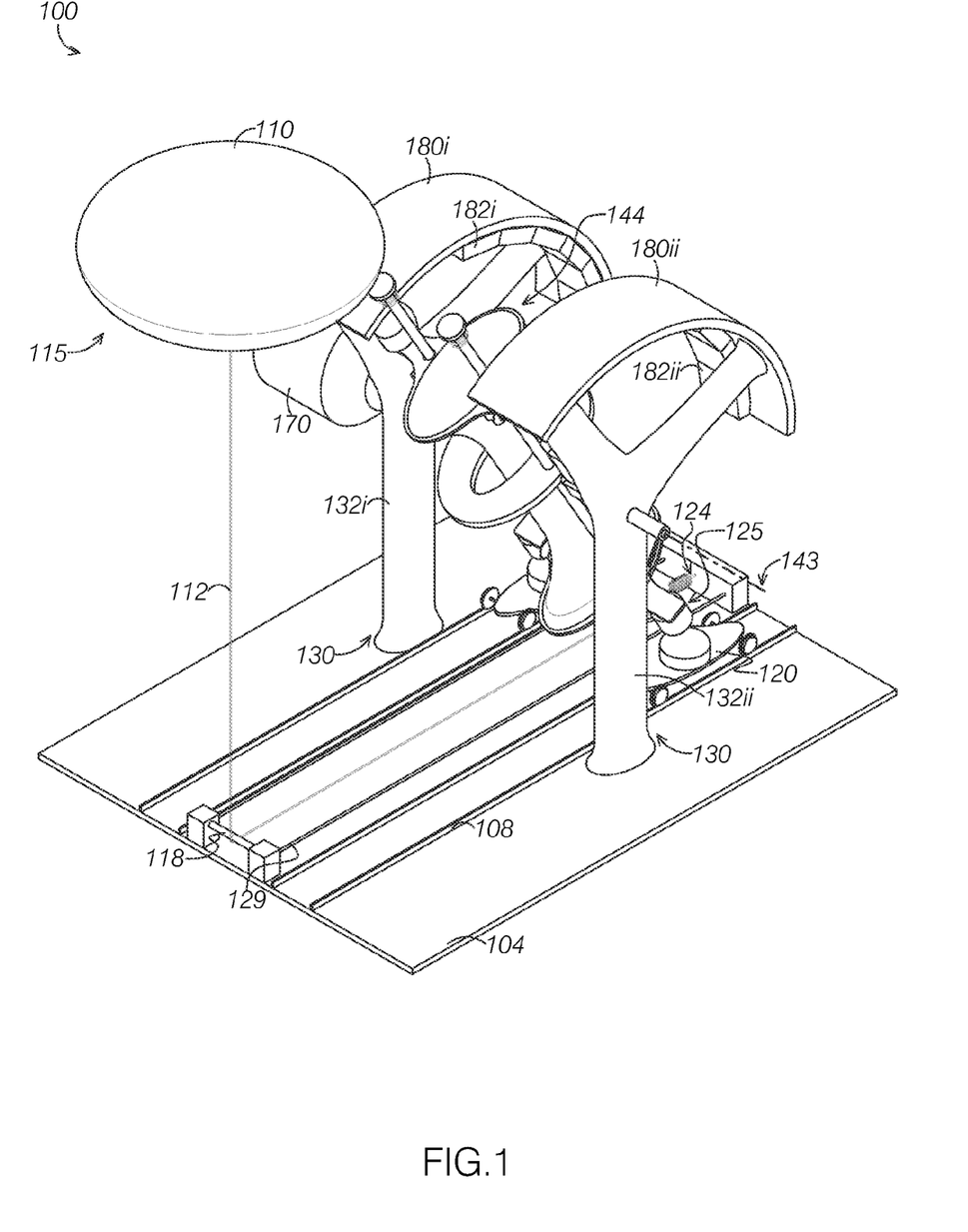
FIG. 1 is a perspective view of a first example of a wave actuated device depicting a primary buoy in a lower position and a carriage in a first position.

As FIG. 1 illustrates, linkage 112 extends between primary buoy 110 and carriage 120. Linkage 112 is configured to transmit the buoyancy force produced by primary buoy 110 to carriage 120, thereby wave energy to move carriage 120 as primary buoy 110 moves towards upper position 116.

Figure 2:
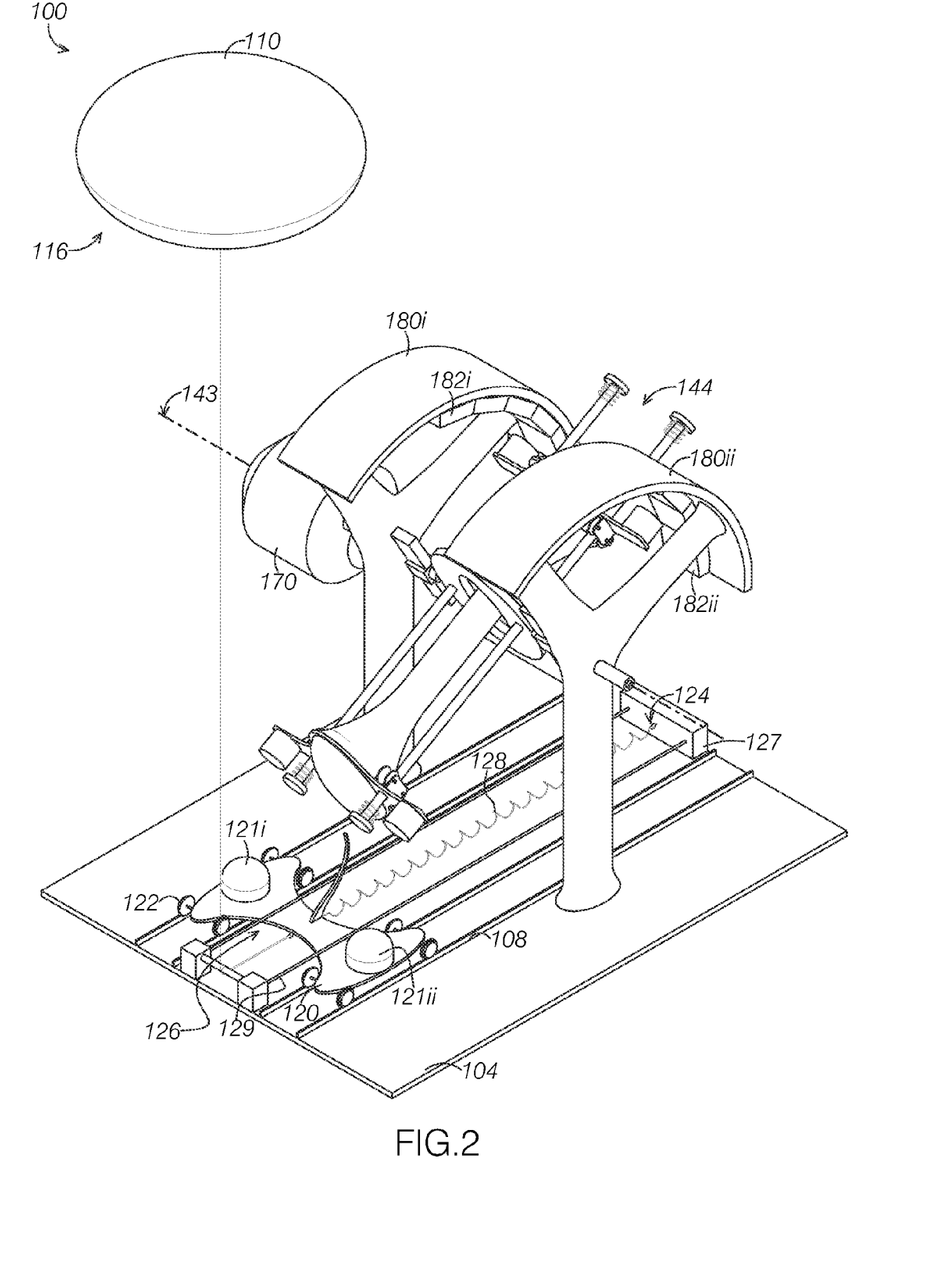
FIG. 2 is a perspective view of the wave actuated device shown in FIG. 1 depicting the primary buoy in an upper position and the carriage in a second position.
Figure 6:
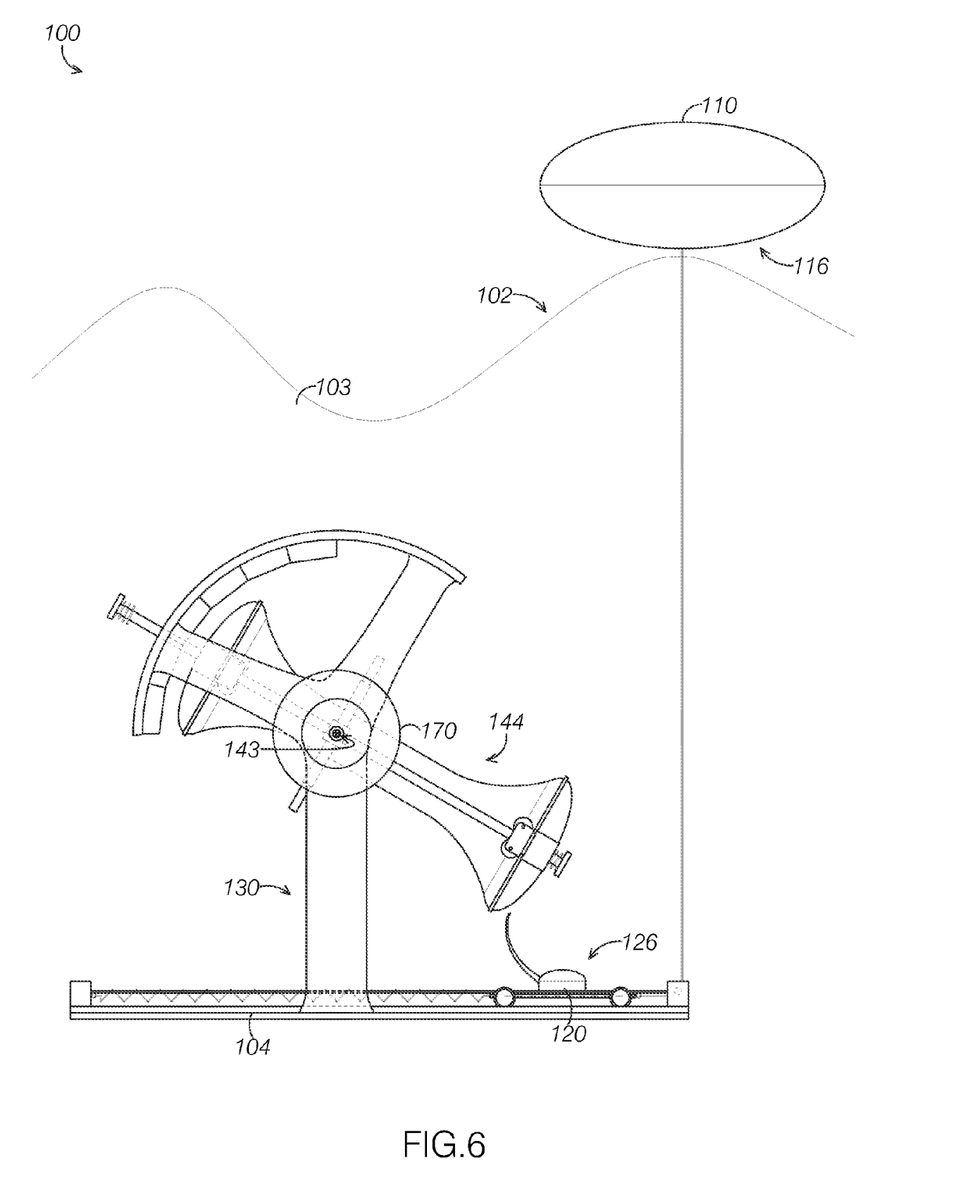
FIG. 6 is a side elevation view of the wave actuated device shown in FIG. 1 depicting the primary buoy in the upper position and the carriage in the second position.
Figure 7:
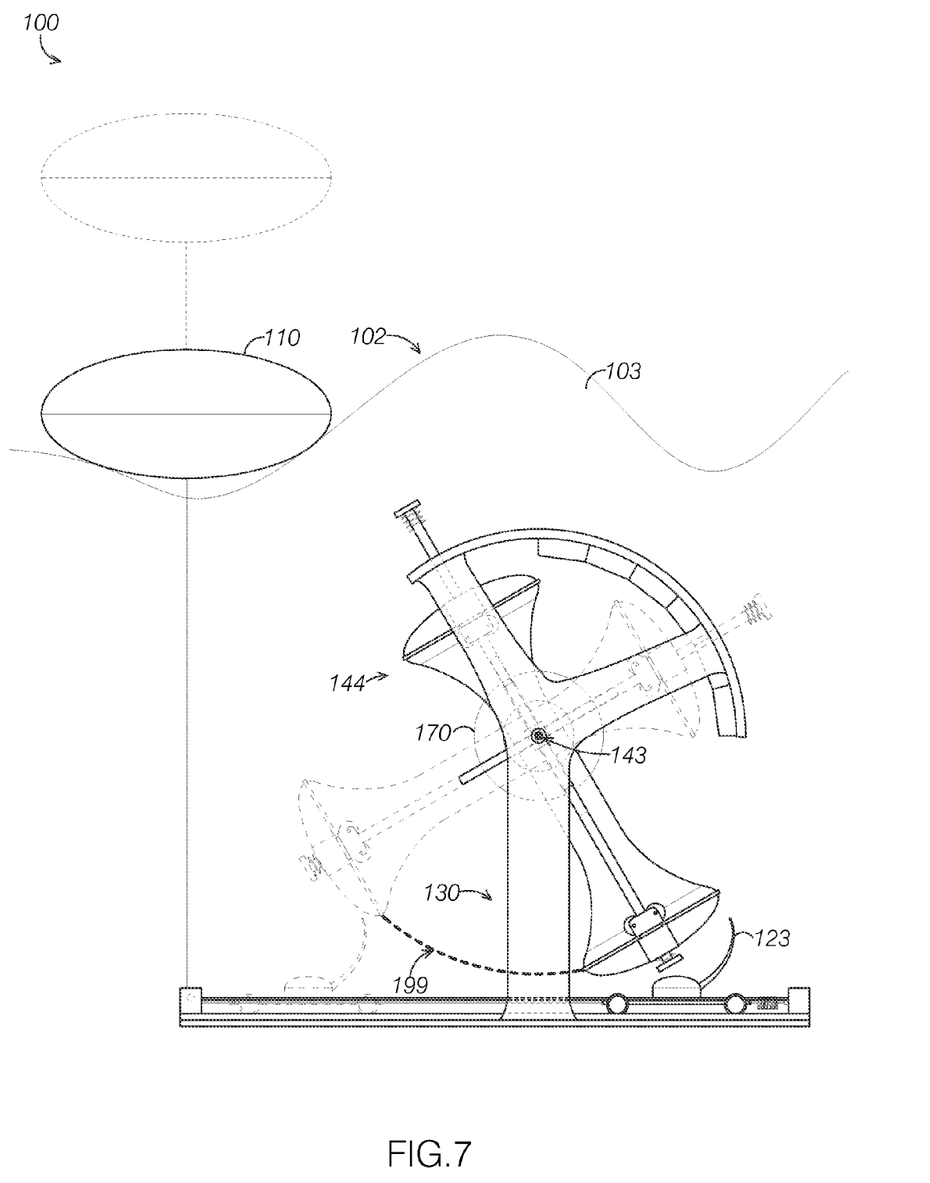
FIG. 7 is a side elevation view the wave actuated device shown in FIG. 1 viewed from an opposite side of FIG. 5 depicting the primary buoy in the lower position and the carriage in the first position.

As FIGS. 1, 2, 5, and 6 illustrate, carriage 120 is movably supported on a support surface 104. Carriage 120 is additionally coupled to primary buoy 110 by linkage 112. Carriage 120 includes a first carriage magnetically interactive material 121$i$, a second carriage magnetically interactive material 121$ii$, wheels 122, and a biasing element 124. As FIG. 7 shows, carriage 120 additionally includes carriage hook 123. As FIGS. 1 and 5 show, carriage 120 is initially biased towards a first position 125 by biasing element 124. As FIGS. 2 and 6 show, carriage 120 is configured to be pulled along a carriage path towards a second position 126 from first position 125 as primary buoy 110's buoy force is applied via linkage 112.

Wave actuated device 100 may be scaled up to ocean waves or scaled down to small-crested waves by modifying the length of linkage 112 and/or the carriage path.

Support surface 104 is illustrated as a discrete element. However, support surfaces may define natural surfaces or be present in the environs of wave actuated devices as well.

Figure 9:
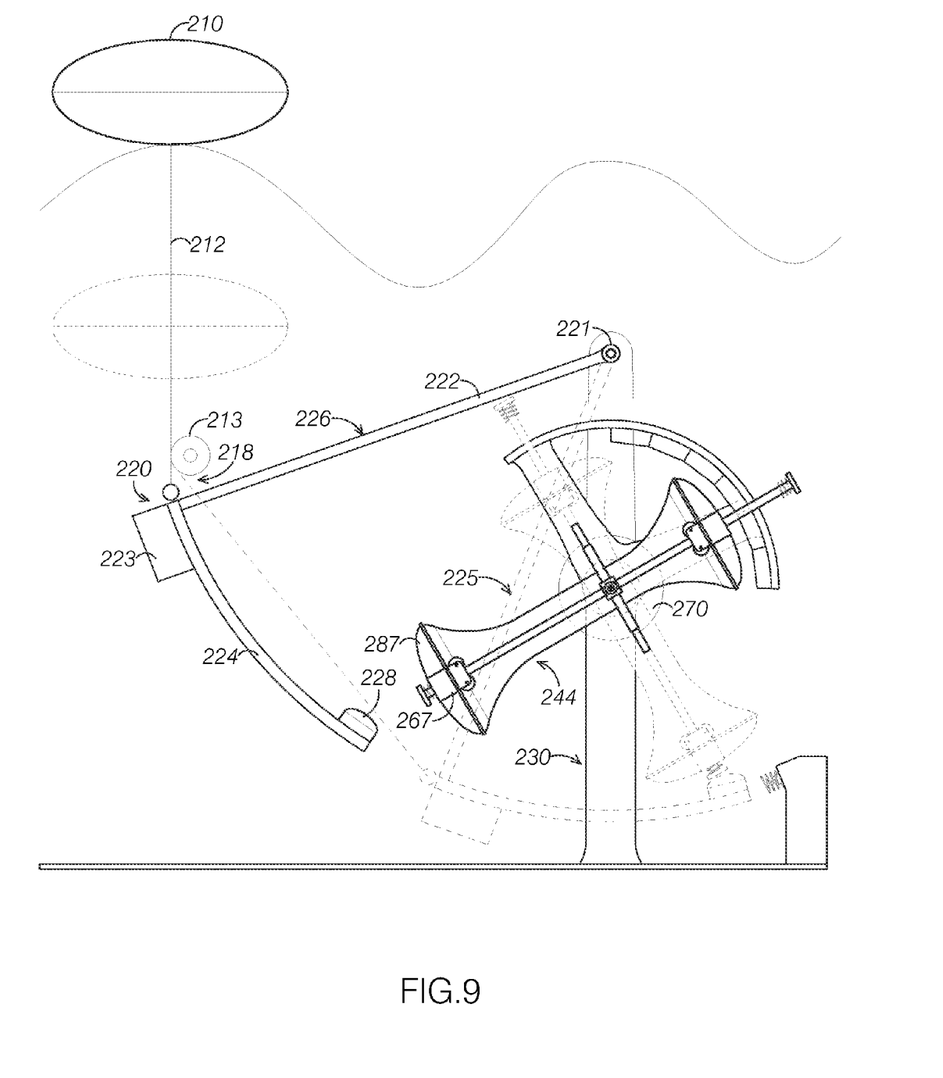
FIG. 9 is a side elevation view of a second example of a wave actuated device including a swing arm carriage.

As FIG. 1 shows, rails 108 extend on support surface 104 and are substantially aligned with the carriage path. Rails 108 slide carriage 120 as it is pulled from first position 125 to second position 126. In the example shown in FIGS. 1-8, wave actuated device 100 includes four rails. In other examples, the wave actuated device may include fewer rails, such as two rails, one rail, or no rails, as shown in FIG. 9. In other examples, the wave actuated device may include more than four rails.

As FIG. 2 illustrates, carriage 120 includes first carriage magnetically interactive material 121$i$ mounted to its top. First carriage magnetically interactive material 121$i$ is configured to move along the carriage path along with carriage 120. As FIG. 2 illustrates, carriage 120 additionally includes second carriage magnetically interactive material 121$ii$ mounted to the top of carriage 120 spaced from first carriage magnetically interactive material 121$i$. Second carriage magnetically interactive material 121$ii$ is substantially similar first carriage magnetically interactive material 121$i$. Though, in other examples the magnetically interactive materials are dissimilar.

With reference to FIG. 2, carriage 120 additionally includes wheels 122 connected along its bottom. Wheels 122 movably support carriage 120 along the carriage path defined by rails 108 and spaced from support surface 104. In some examples, the support surface may vary in elevation over a portion of its area.

As FIG. 2 shows, biasing element 124 is configured to bias carriage 120 towards a carriage anchor 127. More specifically, biasing element 124 defines a coil spring 128 attached to carriage 120 on a first side and carriage anchor 127 on a second side opposite the first. As FIG. 2 illustrates, coil spring 128 is configured to expand as primary buoy 110 moves towards an upper position 116 and bias carriage 120 towards first position 125 as primary buoy 110 returns to lower position 115. Although biasing element 124 defines a coil spring, biasing elements are not required to define springs. For example, biasing elements may additionally or alternatively include a segment of an elastic material, such as rubber.

Looking to FIG. 1, linkage guide 118 defines a bar spaced from support surface 104. Linkage 112 is routed around linkage guide 118 to redirect the vertical buoyancy force of primary buoy 110's to a horizontal that moves carriage 120 from first position 125 to second position 126. In some embodiments, the linkage guide includes one or more pulleys to realize a greater mechanical advantage than linkage guide 118 illustrated in FIGS. 1-8 as primary buoy 110 pulls carriage 120.

Looking to FIGS. 1 and 2, retaining bar 129 extends above carriage 120 along the carriage path between first position 125 and second position 126. Retaining bar 129 is configured to retain carriage 120 proximate support surface 104.

As FIG. 1 shows, support structure 130 extends vertically from support surface 104. Support structure 130 includes a first support column 132$i$ and a second support column 132$ii$. Support structure 130 retains arm 144 pivotally supported vertically spaced from support surface 104.

Figure 3:
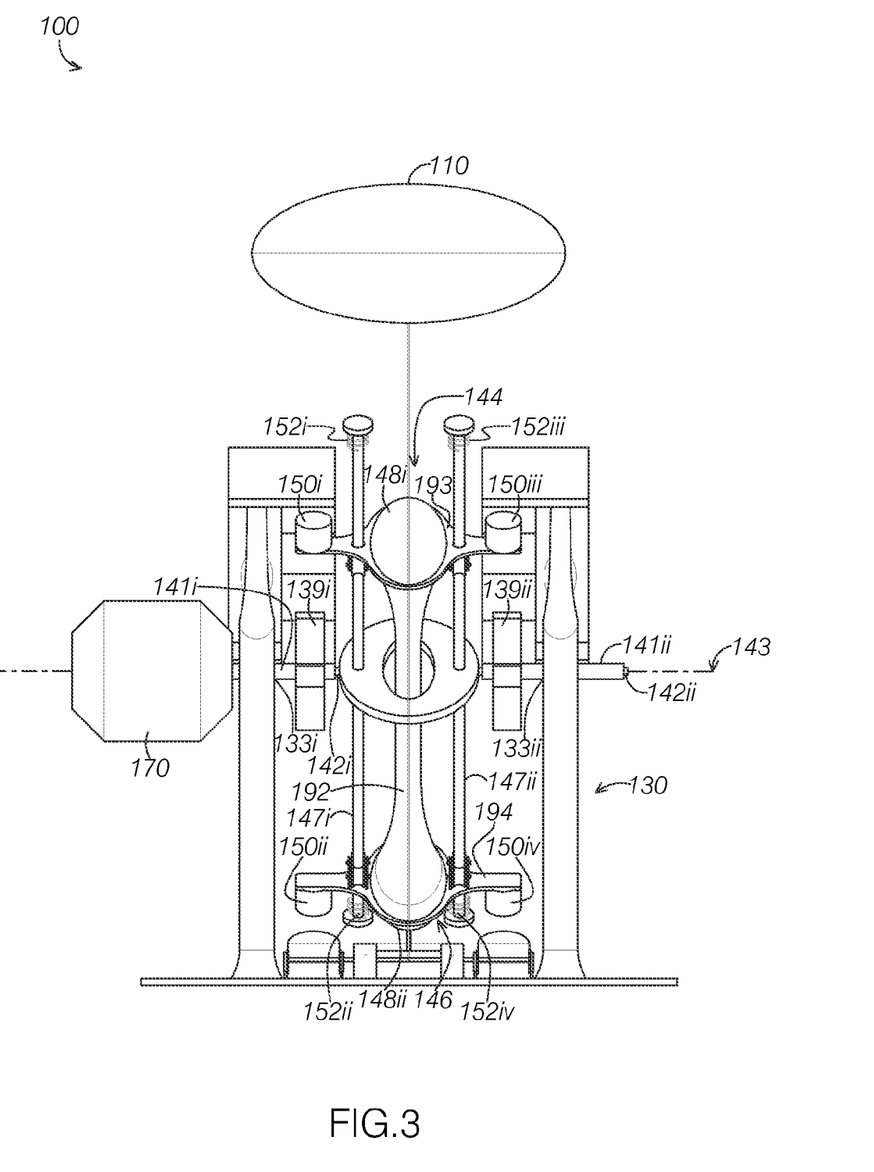
FIG. 3 is a front elevation view of the wave actuated device shown in FIG. 1 depicting the primary buoy in the lower position and the carriage in the first position.
Figure 4:
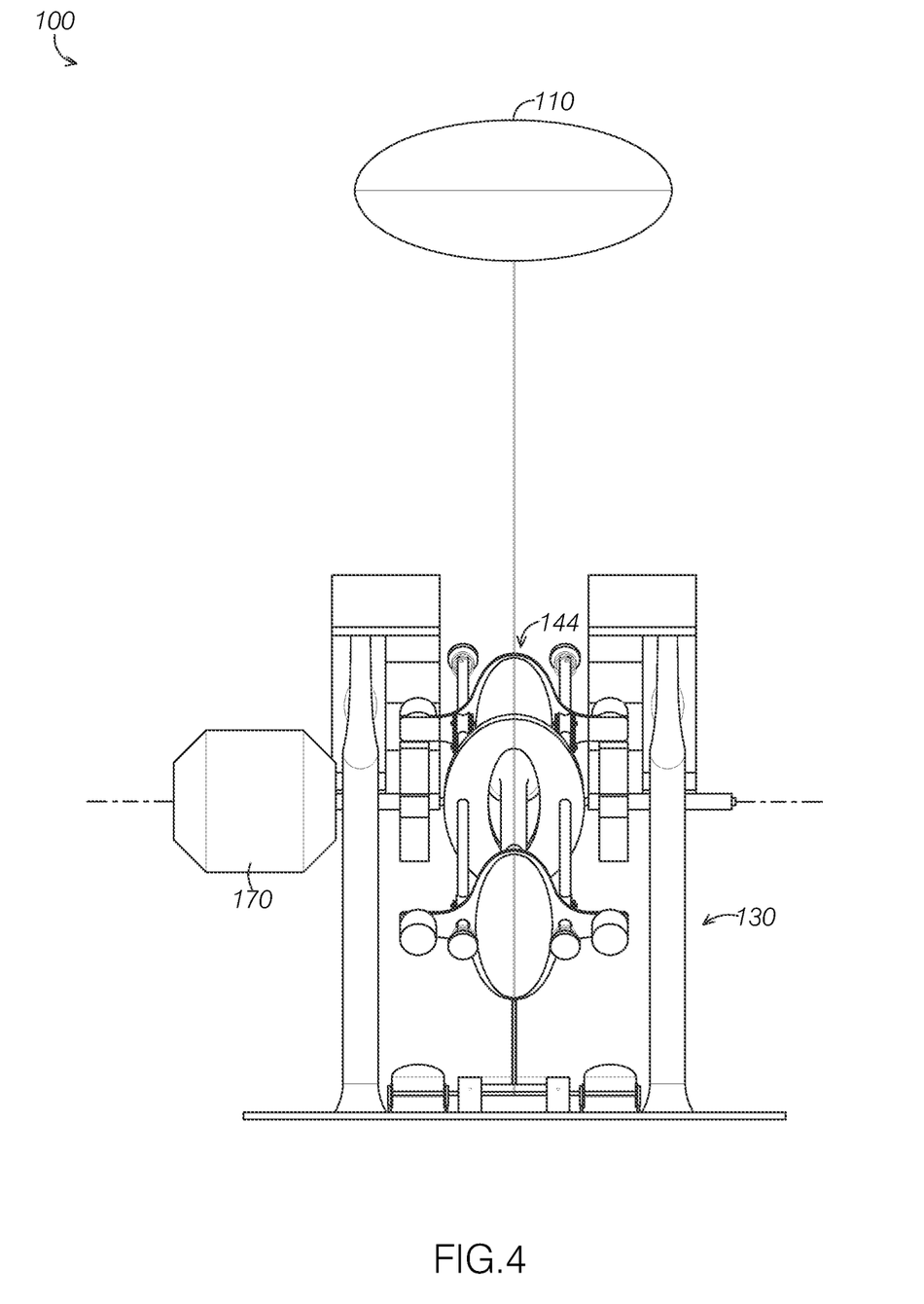
FIG. 4 is a front elevation view of the wave actuated device shown in FIG. 1 depicting the primary buoy in the upper position and the carriage in the second position.

Looking to FIG. 1, first support column 132$i$ extends vertically from support surface 104. As FIG. 3 shows, first support column 132$i$ defines an opening 133$i$. First tube 141$i$ extends from first support column 132$i$ defining a center opening to opening 133$i$. First driveshaft 142$i$ is routed through first tube 141$i$ and opening 133$i$, rotatably supporting first driveshaft 142$i$ in a position vertically spaced from support surface 104. First support column 132$i$ is additionally configured to support generator 170 on a side opposite opening 133$i$ and route first driveshaft 142$i$ into generator 170.

As FIG. 1 shows, second support column 132$ii$ is substantially similar to first support column 132$i$. Second support column 132$ii$ extends from support surface 104 and is spaced across the carriage path from first support column 132$i$. Second support column 132$ii$ rotatably supports second driveshaft 142$ii$ in an opening 133$ii$ and second tube 141$ii$ similar to how first support column 132$i$ supports first driveshaft 142$i$.

As FIG. 3 shows, first driveshaft 142$i$ is drivingly coupled with generator 170 on a first end and is connected to arm 144 on a second end distal second support column 132$ii$. Second driveshaft 142$ii$ is routed through opening 133$ii$ and is pivotally supported by first support column 132$i$ proximate its first end. As FIGS. 5-8 illustrate, second driveshaft 142$ii$ defines a pivot 143 extending through its center. First driveshaft 142$i$ is connected to arm 144 and is configured to rotate within first support column 132$i$ to allow arm 144 to rotate about pivot 143. First driveshaft 142$i$ is configured to drive generator 170 as arm 144 rotates in this manner.

As FIG. 3 illustrates, second driveshaft 142$ii$ is substantially similar to first driveshaft 142$i$. Second driveshaft 142$ii$ is pivotally supported by second support column 132$ii$ on a first end, aligned with first driveshaft 142$i$. Pivot 143 thus extends through second driveshaft 142$ii$'s center along with first driveshaft 142$i$'s center. Second driveshaft 142$ii$ rotatably connects arm 144 to second support column 132$ii$ similar to how first driveshaft 142$i$ connects arm 144 to first support column 132$i$.

As FIGS. 1-8 illustrate, arm 144 is rotatably connected to support structure 130 by first driveshaft 142$i$ on a first side and by second driveshaft 142$ii$ on a second side opposite the first side. As FIG. 3 shows, arm 144 includes a first shaft 147$i$, a second shaft 147$ii$, a chassis 146, a first arm supplemental buoy 148*i*, second arm supplemental buoy 148*ii*, a first arm magnetically interactive material 150*i*, second arm magnetically interactive material 150*ii*, a third arm magnetically interactive material 150*iii*, a fourth arm magnetically interactive material 150*iv* a first arm biasing member 152*i*, a second arm biasing member 152*ii*, a third arm biasing member 152*iii*, and a fourth arm biasing member 152*iv*. As FIG. 5 illustrates, arm 144 extends from a first end 145 to a second end 149.

As FIG. 3 illustrates, first shaft 147*i* extends transverse to first driveshaft 142*i*. Similarly, second shaft 147*ii* extends transverse to second driveshaft 142*ii*, which is substantially aligned with first shaft 147*i*.

As FIG. 3 shows, arm 144 includes first shaft 147*i* and second shaft 147*ii*. Chassis 146 includes a first chassis member 193 and a second chassis member 194. First chassis member 193 is connected to second chassis member 194 by first arm supplemental buoy 148*i*, second arm supplemental buoy 148*ii*, and an arm supplemental buoy spacer 192 extending between the two arm supplemental buoys.

Chassis 146 is configured to slide along first shaft 147*i* and second shaft 147*ii* as arm 144 rotates about pivot 143, being pulled towards the liquid surface as either first arm supplemental buoy 148*i* or second arm supplemental buoy 148*ii* as they float towards the liquid surface. Chassis 146 is affixed to first driveshaft 142*i* and second driveshaft 142*ii* via first shaft 147*i* and second shaft 147*ii*. Arm 144 moves in concert with chassis 146, and vice versa.

As FIG. 3 illustrates, first arm biasing member 152*i* is attached to first shaft 147*i* positioned proximate a first end of first shaft 147*i*, which is spaced from pivot 143. First arm biasing member 152*i* defines a spring configured to restrain chassis 146 from sliding beyond a selected point on first shaft 147*i*. First arm biasing member 152*i* is additionally configured to bias chassis 146 towards pivot 143 if it extends beyond this selected point.

As FIG. 3 shows, wave actuated device 100 additionally includes third arm biasing member 152*iii* attached to first shaft 147*i* proximate first end 145. Wave actuated device 100 additionally includes second arm biasing member 152*ii* positioned on first shaft 147*i* at a position proximate second end 149. A fourth arm biasing member 152*iv* is positioned on second shaft 147*ii* at a position proximate second end 149. Second arm biasing member 152*ii*, third arm biasing member 152*iii*, and fourth arm biasing member 152*iv* are configured to restrain and bias chassis 146 in a similar manner to first arm biasing member 152*i*.

As FIG. 3 illustrates, first arm magnetically interactive material 150*i* is attached to first chassis member 193 proximate first arm biasing member 152*i*. First arm magnetically interactive material 150*i* is configured to magnetically interact with first carriage magnetically interactive material 121*i* to couple with first carriage magnetically interactive material 121*i* through a trigger arc 199, shown in FIG. 7, that is substantially aligned with the carriage path. Additionally, first arm magnetically interactive material 150*i* is configured to decouple from first carriage magnetically interactive material 121*i* as carriage 120 approaches second position 126.

When first arm magnetically interactive material 150*i* and first carriage magnetically interactive material 121*i* are magnetically coupled, carriage 120 is configured to pull arm 144 through trigger arc 199 as carriage 120 moves between first position 125 and second position 126. As this occurs, carriage 120 harnesses wave energy by applying primary buoy 110's buoyancy force to arm 144. As carriage 120 rotates arm 144, arm 144 drives generator 170 via first driveshaft 142*i*.

As FIG. 3 illustrates, second arm magnetically interactive material 150*ii* is positioned on second chassis member 194 proximate a second end of first shaft 147*i* and distal first arm magnetically interactive material 150*i*. Second arm magnetically interactive material 150*ii* is configured to similarly interact with first carriage magnetically interactive material 121*i*. Third arm magnetically interactive material 150*iii* and fourth arm magnetically interactive material 150*iv* are similarly attached on second shaft 147*ii* to interact with second carriage magnetically interactive material 121*ii*.

The magnetic interaction between the carriage magnetically interactive materials and the area magnetically interactive materials augment the efficiency by which wave actuated device 100 harnesses liquid body 102's wave energy via primary buoy 110 and carriage 120. Carriage 120's carriage magnetically interactive materials attract the corresponding arm magnetically interactive, materials when the arm magnetically interactive materials approach the carriage magnetically interactive materials. For example, as the first end of arm 144 moves towards the surface of liquid body 102, first arm magnetically interactive material 150*i* and third arm magnetically interactive material 150*iii* and first carriage magnetically interactive material 121*i* and second carriage magnetically interactive material 121*ii* are attracted to one and drive arm 144 as they attract. This allows wave actuated device 100 to improve upon the energy typically produced in a tidal generator.

Figure 8:
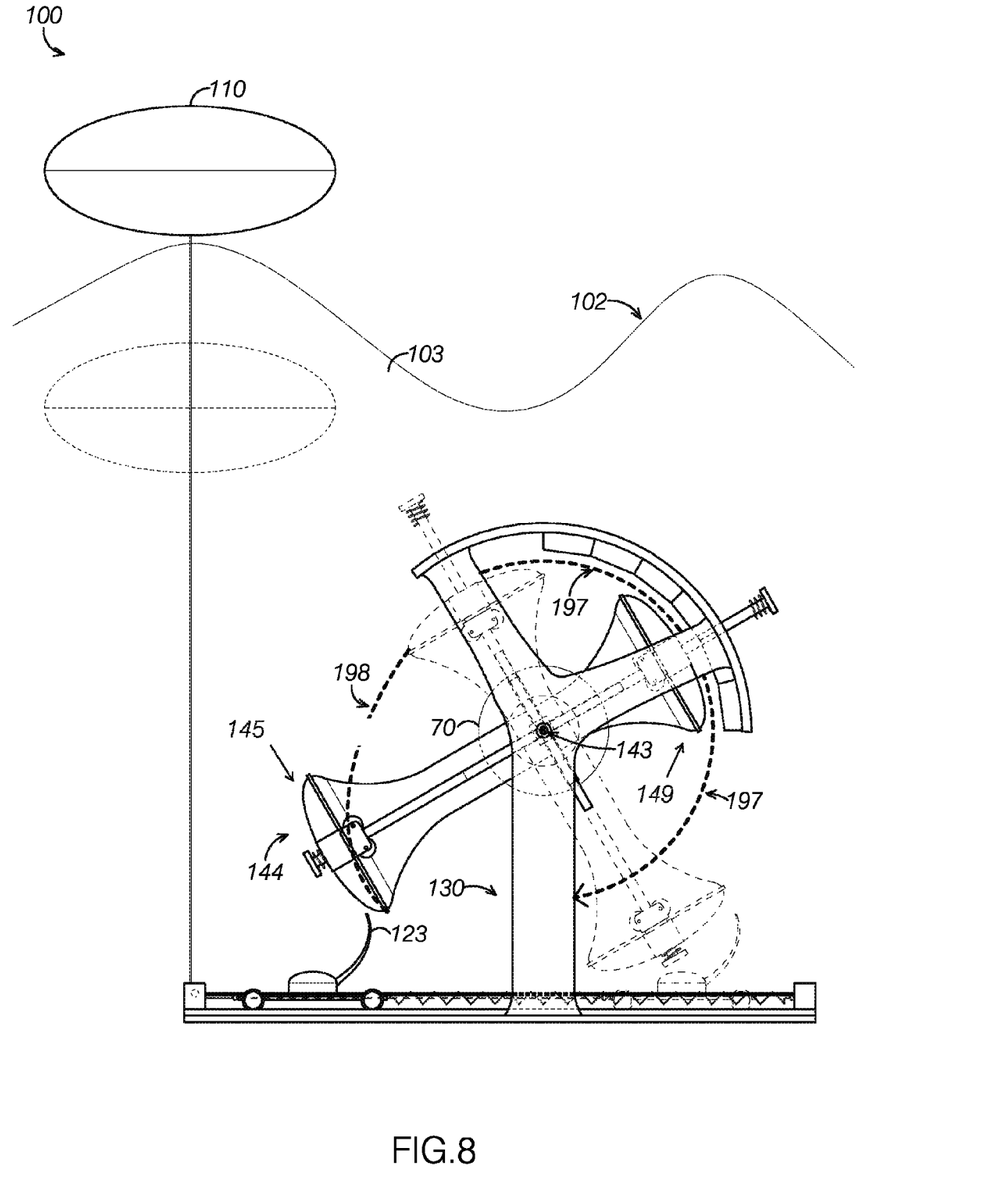
FIG. 8 is a side elevation view of the wave actuated device shown in FIG. 1 viewed from an opposite side as FIG. 5 depicting the primary buoy in the upper position and the carriage in the second position.

As FIGS. 7 and 8 show, carriage hook 123 is mounted to the top of carriage 120. Carriage hook 123 is configured to engage arm 144 as arm 144 travels through trigger arc 199. By implementing carriage hook 123, the attractive force between the carriage magnetically interactive materials and the arm magnetically interactive materials may be reduced.

As FIG. 3 shows, first arm supplemental buoy 148*i* is connected to first chassis member 193. First arm supplemental buoy 148*i* is spaced from second chassis member 194 and second arm supplemental buoy 148*ii* by arm supplemental buoy spacer 192. First arm supplemental buoy 148*i* contains a volume of gas that produces an upward buoyancy force in liquid 103 selected to drive first end 145 of arm 144 through a drive arc 198 seen in FIG. 8. This upward buoyancy force additionally slides chassis 146 toward the first ends of first shaft 147*i* and second shaft 147*ii*.

As First arm supplemental buoy 148*i* applies a upward buoyancy force to arm 144, it harnesses the potential energy a submerged first arm supplemental buoy 148*i* by driving arm 144 (thereby driving generator 170 by the mechanism discussed above). This augments the wave energy harnessed via primary buoy 110 and carriage 120 through trigger arc 199. This allows wave actuated device 100 to augment the force typically produced in a tidal generator.

As FIG. 3 shows, second arm supplemental buoy 148*ii* is connected to second chassis member 194 proximate second end 149 of arm 144. Second arm supplemental buoy 148*ii* is spaced from first arm supplemental buoy 148*i* by arm supplemental buoyancy spacer 192. Second arm supplemental buoy 148*ii* is substantially similar to first arm supplemental buoy 148*i* and contains a volume of gas that produces an upward buoyancy force in liquid 103 selected to drive second end 149 of arm 144 through drive arc 198.

In some embodiments, the arm may include a scoop positioned at a second end of the arm. The scoop may define a concave shape opening opposite the direction of the arm's rotation in a trigger arc and a drive arc. In additional or alternative examples, the scoop may define a concave shape opening in the direction of the arm's rotation in a trigger arc and a drive arc. In various examples, arms may include scoops proximate the first end of the arm, the second end of the arm, or both. By using such a scoop, water may flow more freely in one direction and catch the flow of water in another direction, allowing the arm to rotate with less resistance and to be partially driven by the inertia of moving water.

As FIG. 1 shows, first arc segment 180$i$ extends in an arc from first support column 132$i$. First arc segment 180$i$ includes a first supplemental magnetically interactive material 182$i$ routed along a portion of first arc segment 180$i$ configured to magnetically repel first arm magnetically interactive material 150$i$ and/or second arm magnetically interactive material 150$ii$. As first supplemental magnetically interactive material 182$i$ repels first arm magnetically interactive material 150$i$ or second arm magnetically interactive material 150$ii$, first end 145 or second end 149, respectively, pivots through a supplemental arc 197 shown in FIG. 8 in response to the magnetic repulsion band an opposing buoyancy force produced by the opposing end of arm 144.

When first supplemental magnetically interactive material 182$i$ and second supplemental magnet 182$ii$ repel a proximate end of arm 144, this substantially shifts the pivot point of arm 144 along its length. Because the supplemental buoy in the drive arc is spaced from pivot 143 at a greater distance than the supplemental buoy in the supplemental arc, the buoyancy force produced by the supplemental buoy in the drive arc gains a mechanical advantage over the supplemental buoy in the supplemental arc. As a result, the supplemental buoy in the drive arc more easily moves through the drive arc by counteracting buoyancy force of the supplemental buoy in the supplemental arc.

With reference to FIG. 1, second arc segment 180$ii$ extends in an arc from second support column 132$ii$ and is substantially aligned with first arc segment 180$i$. Second arc segment 180$ii$ includes a second supplemental magnet 182$ii$ configured to magnetically repel third arm magnetically interactive material 150$iii$ and/or fourth arm magnetically interactive material 150$iv$ and similarly pivot arm 144 through supplemental arc 197. The magnetic interaction between the arm magnetically interactive materials and the supplemental magnetically interactive materials additionally push arm 144 through supplemental arc 197.

As FIG. 3 shows, first tube magnetically interactive material 139$i$ is positioned on first tube 141$i$ proximate first supplemental magnetically interactive material 182$i$. Similarly, second tube magnetically interactive material 139$ii$ is positioned on second tube 141$ii$ proximate second supplemental magnet 182$ii$. First tube magnetically interactive material 139$i$ and second tube magnetically interactive material 139$ii$ are configured to augment the supplemental magnetically interactive materials and/or the carriage magnetically interactive materials in driving arm 144 away from the arc segments through supplemental arc 197. Driving arm 144 away from the arc segments may be important to properly align either first end 145 or second end 149 with the arc segments as it enters the supplemental arc and to drive the opposite end near first position 125 of carriage 120.

As FIG. 3 shows, generator 170 is mounted on first support column 132$i$. As mentioned above, generator 170 is drivingly coupled with first driveshaft 142$i$ to generate electricity as arm 144 rotates. This allows generator 170 to harness wave energy with support from the buoyancy and magnetic forces discussed above.

Turning attention to FIG. 9, a second example of a wave actuated device, wave actuated device 200 will now be described. As FIG. 9 shows, wave actuated device 200 includes many features similar or identical to wave actuated device 100. Accordingly, each and every feature of wave actuated device 200 will not be exhaustively described, but rather the differences between wave actuated device 200 and wave actuated device 100 will be discussed.

As FIG. 9 illustrates, wave actuated device 200 harnesses wave, buoyant, and magnetic forces to generate electricity similar to wave actuated device 100. A difference between the wave actuated devices is the different carriage design of wave actuated device 200. Wave actuated device 200 includes a swing arm carriage 220 which is configured to pivot through a trigger arc rather than ride on rails. Wave actuated device 200 also includes a primary buoy 210, a linkage guide 218, a support structure 230, an arm 244, and a generator 270, each substantially similar to the corresponding elements of wave actuated device 100.

However, as FIG. 9 shows, swing arm carriage 220 differs from carriage 120. Swing arm carriage 220 includes a carriage pivot 221, a carriage arm 222, a biasing element 223, a carriage platform 224, and a carriage magnetically interactive material 228. Unlike carriage 120, swing arm carriage 220 is configured to swing about carriage pivot 221 between a first position 225 and second position 226.

As FIG. 9 shows, arm 244 extends from carriage pivot 221 at a first end to a second end below arm 244. Carriage arm 222 is connected to primary buoy 210 by a linkage 212, different from linkage 112 in that it pulls swing arm carriage 220 along an arcuate carriage path. As arm 244 rotates, it drives generator 270 to generate electrical energy.

FIG. 9 additionally illustrates pulley 213 defining a pulley 213. Pulley 213 is configured to direct linkage 212 similar to linkage guide 118. However, pulley 213 utilizes the mechanical advantage of a pulley. As previously mentioned, this disclosure specifically contemplates linkage guides that define multiple pulley systems in addition to the single pulley system shown in FIG. 9.

Wave actuated device 200 additionally includes a carriage platform 224 extending from carriage arm 222 which is configured to be positioned proximate arm 244 at first position 225. Wave actuated device 200 additionally includes a carriage magnetically interactive material 228 positioned on carriage platform 224.

FIG. 9 also shows that wave actuated device 200 includes biasing element 223 defining a weight positioned on the bottom of swing arm carriage 220. The weight is configured to bias swing arm carriage 220 towards the lower first position 225 when not acted upon by primary buoy 210.

As FIG. 9 illustrates, primary buoy 210 is configured to pull swing arm carriage 220 from first position 225 towards second position 226. As this occurs, arm 244 is configured to pivot through a trigger arc in response to swing arm carriage 220 moving and to magnetic interaction from an arm magnetically interactive material 267 and from carriage magnetically interactive material 228. Arm 244 is additionally configured to rotate through a drive arc in response to the upward buoyancy force of a supplemental buoy 287.

In some examples, wave actuated devices may be substantially contained within enclosures. In such examples, the primary buoys are outside the enclosure, and the linkage is configured to interface the primary buoy with the carriage through the enclosure. In such enclosed embodiments, the carriage may move about a support surface defined by the bottom of the enclosure's interior. Additionally or alternatively, the enclosure may rotatably support the arm and/or driveshafts. In some examples, the enclosure may additionally include columns extending through its interior configured to rotatably support the arm and/or driveshafts. In further examples, the enclosure may define walls configured to the support and/or the driveshafts.

Additionally or alternatively, some examples of wave actuated devices may be enclosed by being buried below the liquid body. In such examples, a primary buoy outside of the enclosure may be interfaced to a carriage inside the enclosure by the linkage.

Carriage hook 123 is mounted on carriage 120 and is configured to engage arm 144 through trigger arc 199. However, this disclosure considers the opposite arrangement, wherein the arm includes a hook configured to engage the carriage through the trigger arc. Examples similar to wave actuated device 200 illustrated in FIG. 9 may also implement a similar carriage hook.

Although FIGS. 1-8 and FIG. 9 illustrate a single wave actuated device, this disclosure specifically contemplates examples that include a plurality of multiple wave actuated devices operating in concert to harness wave energy at multiple points. In some examples, the plurality of wave actuated devices may be aligned along the pivots of their arms. Additionally or alternatively, the wave actuated devices may be electrically connected to one another to output generated power to a single destination.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel anti non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A wave actuated device for converting wave energy from waves passing through water into mechanical work, the wave actuated device comprising:
   a primary buoy floating in the water and configured to rise and fall with the waves as they pass through the water between a lower position and an upper position;
   a carriage coupled to the primary buoy by a linkage and moving between a first position and a second position, the carriage being in the first position when the primary buoy is in the lower position and the primary buoy pulling the carriage via the linkage to the second position when the primary buoy floats to the upper position;
   a carriage magnetically interactive material mounted to the carriage;
   a support structure extending from a support surface and including a pivot spaced from the support surface; and
   an arm pivotally supported on the pivot and extending from the pivot to a first end proximate the carriage magnetically interactive material mounted on the carriage, the arm being submerged in the water and including:
   a supplemental buoy,
   an arm magnetically interactive material proximate the first end of the arm;
   wherein:
   at least one of the carriage magnetically interactive material and the arm magnetically interactive material includes a magnet and the carriage magnetically interactive material and arm magnetically interactive material interact by being magnetically attracted to each other;
   the arm pivots through a trigger arc about the pivot in response to the carriage moving from the first position to the second position and to the attractive interaction between the carriage and arm magnetically interactive materials; and
   the arm pivots through a drive arc in response to the upward buoyancy force of the supplemental buoy.

2. The wave actuated device of claim 1, wherein:
   the second position is vertically and horizontally spaced from the first position; and
   the carriage is configured to swing between the first position and the second position.

3. The wave actuated device of claim 1, further comprising a supplemental magnetically interactive material supported by the support structure in a position proximate the arm magnetically interactive material at an end of the drive arc opposite the trigger arc, at least one of the arm magnetically interactive material and the supplemental magnetically interactive material including a magnet and the arm and supplemental magnetically interactive materials interacting by being magnetically attracted to each other, the supplemental magnetically interactive material pivoting the arm through a supplemental arc about the pivot in response to the magnetic attraction between the arm and supplemental magnetically interactive materials.

4. The wave actuated device of claim 1, wherein the carriage includes a biasing element that biases the carriage towards the first position.

5. The wave actuated device of claim 1, wherein the arm defines a first arm and a first arm end; and
   further comprising a second arm end extending from the pivot opposite the first arm, the second arm including:
   a second supplemental buoy; and
   a third magnetically interactive material.

6. The wave actuated device of claim 1, wherein the arm includes a second supplemental buoy.

7. The wave actuated device of claim 1, wherein:
   the second magnetic material defines a first arm magnetic body;
   the arm includes a second arm magnetic body.

8. The wave actuated device of claim 1, wherein the carriage is movably supported on a wheel.

9. The wave actuated device of claim 1, wherein the carriage includes a carriage hook configured to engage the arm through the trigger arc.

10. The wave actuated device of claim 1, further comprising a rail proximate the carriage aligned with a carriage path defined by the first carriage position and the second carriage position, the rail configured to guide the carriage along the carriage path.

11. The wave actuated device of claim 1, wherein the pivot includes a drive shaft extending from the pivot opposite the arm.

12. The wave actuated device of claim 11, wherein the drive shaft drives a generator as the arm pivots.

13. The wave actuated device of claim 1, wherein the supplemental buoy is slidingly mounted on the arm.

14. The wave actuated device of claim 13, wherein the arm includes a biasing member on the first end of the arm configured to bias the supplemental buoy towards the pivot.

15. The wave actuated device of claim 1, wherein the arm magnetically interactive material is slidingly mounted on the arm.

16. The wave actuated device of claim 15, wherein the arm includes an arm biasing member on the first end of the arm configured to bias the arm magnetically interactive material towards the pivot.

17. The wave actuated device of claim 1, wherein the linkage includes a linkage guide spaced from the carriage.

18. The wave actuated device of claim 1, further comprising a carriage hook mounted to the top of the carriage, the carriage hook configured to engage the arm as the arm travels through the trigger arc.

19. A wave actuated device for converting wave energy from waves passing through water into mechanical work, the wave actuated device comprising:
- a carriage moving between a first position and a second position;
- a support structure extending from a support surface and including a pivot spaced from the support surface;
- a supplemental magnetically interactive material supported by the support structure; and
- an arm pivotally supported on the pivot and extending from the pivot to a first end proximate the carriage magnetically interactive material mounted on the carriage, the arm being submerged in the water and including:
  - a chassis slidingly mounted on the arm, the chassis including a supplemental buoy; and
  - an arm magnetically interactive material proximate the first end of the arm;
- wherein:
  - the carriage is configured to couple with the first end of the arm through a trigger arc and pivot the first end of the arm when coupled;
  - the arm pivots through a drive arc in response to the upward buoyancy force of the supplemental buoy; and
  - the arm magnetically interactive material and the supplemental magnetically interactive material are selected to repel one another and drive the chassis distal the supplemental magnetically interactive material in a supplemental arc substantially opposite the drive arc.

20. A wave actuated device configured to be placed in a liquid body containing a selected liquid defining a surface that varies in height, the wave actuated device comprising:
- a swing arm carriage including:
  - a carriage pivot;
  - a carriage arm extending from the pivot at a first end to a second end spaced from the carriage pivot, the carriage arm configured to rotate about the carriage pivot from a first position to a second position;
  - a biasing element configured to bias the carriage arm towards the first position;
  - a carriage platform extending from the second end of the carriage arm; and
  - a carriage magnetically interactive material mounted on the carriage platform;
- a primary buoy connected to the swing arm carriage by a linkage, the primary buoy enclosing a volume of gas configured to pull the swing arm carriage from the first position to the second position;
- a support structure extending from a support surface and including a pivot spaced from the support surface; and
- a generating arm pivotally supported on the pivot and extending from the pivot to a first end proximate the carriage magnetically interactive material mounted on the carriage, the arm being submerged in the water and including:
  - a supplemental buoy,
  - a second magnetically interactive material proximate the first end of the arm;
- generator connected to the generating arm configured to be driven by the generating arm as the generating arm rotates;
- wherein:
  - at least one of the carriage magnetically interactive material and the arm magnetically interactive material includes a magnet and the first and arm magnetically interactive materials interact by being magnetically attracted to each other;
  - the arm pivots through a trigger arc about the pivot in response to the carriage moving from the first position to the second position and to the attractive interaction between the first and arm magnetically interactive materials; and
  - the arm pivots through a drive arc in response to the upward buoyancy force of the supplemental buoy.

* * * * *